United States Patent [19]

Iwakami

[11] 3,789,326

[45] Jan. 29, 1974

[54] VARIABLE LINE EQUALIZER

[75] Inventor: Takuya Iwakami, Tokyo, Japan

[73] Assignee: Nippon Electric Company, Limited, Tokyo-to, Japan

[22] Filed: Dec. 7, 1972

[21] Appl. No.: 313,054

[30] Foreign Application Priority Data

Dec. 10, 1971 Japan ............................ 46/100331

[52] U.S. Cl. ................................ 333/28 R, 330/31

[51] Int. Cl. ........................................ H03h 5/00

[58] Field of Search .......... 307/295; 333/28; 330/31

[56] References Cited

UNITED STATES PATENTS 3,422,378 1/1969 LaRosa ................................ 333/28

3,444,474 5/1969 Borenstein et al. .................. 333/28

3,701,033 10/1972 White ................................. 330/31

*Primary Examiner*—John S. Heyman

*Assistant Examiner*—L. N. Anagnos

*Attorney, Agent, or Firm*—Sughrue, Rothwell, Mion, Zinn and Macpeak

[57] ABSTRACT

A variable line equalizer comprising a transistor, uniformly distributed RC networks, and variable capacitors provides compensation for coaxial line attenuation over a wide band of frequencies. The band width is determined by the values $R_T$, $C_T$, and $C_M$, where $R_T$ and $C_T$ are the total resistance and capacitance of the distributed networks, and $C_M$ is the maximum of the variable capacities.

3 Claims, 3 Drawing Figures

VARIABLE LINE EQUALIZER

BACKGROUND OF THE INVENTION

The present invention relates to variable line equalizers for use in a wide-band coaxial line repeater communication system.

Prior art coaxial line repeater systems employ variable line equalizers connected to a part or the whole of the repeaters, for the automatic compensation to a certain extent of the line loss, which depends on variations in the repeater intervals or temperature variations. This system is generally referred to as sloped automatic gain control system. The line loss is proportional to the square root of the frequency. Various equalizers have been in use for this purpose, and typically known is the Bode-type equalizer which is constituted only of passive circuits using one resistor to serve as the variable element. These equalizers essentially comprise the combination of lumped-constant elements such as resistors, capacitors and inductors, although some do not include inductors. Because this type of equalizer uses lumped-constant elements, its transfer function is given in terms of real rational function of complex angular frequency S. Hence, the desired characteristics of variable equalization have been obtained by suitably determining the poles and zeros. However, an increased number of lumped-constant elements are required if it is desired to obtain better approximation with respect to the equalizing characterisitc. This has made it difficult to miniaturize the equalizer, whether or not inductors are used. Furthermore, the impedance characteristic the equalizer exhibits at frequencies above several hundred megahertz is far from what is normally expected because of the stray capacitance and inductance of the lumped-constant elements, and difficulties have been inevitable in designing an equalizer.

SUMMARY OF THE INVENTION

In view of the foregoing, a general object of the present invention is to provide a variable line equalizer which is free of the drawbacks of the conventional system.

Briefly, the equalizer of the present invention consists essentially of a circuit comprising two uniformly distributed RC networks, two variable capacitance elements, and one transistor. This circuit can easily be integrated into a miniature configuration, to allow the stray impedance to be minimized, with the result that the equalizer of this invention can be used at frequencies above several hundred megahertz. In addition, according to the invention, the transfer characteristics can be accurately approximated to the coaxial line loss characteristics over a wide frequency band because the transfer function of the equalizer is given in terms of the first order real rational function with respect to $\sqrt{S}$, as will be described later.

The other objects, features and advantages of the present invention will become apparent from the following description when read in conjunction with the accompanying drawings.

DETAILED DESCRIPTION OF THE INVENTION

Figure 1:
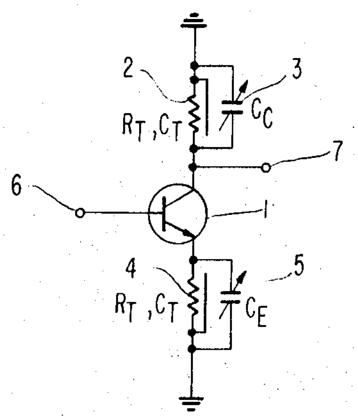
FIG. 1 is a circuit diagram showing a basic circuit of the variable line equalizer of the present invention, in which the numeral 1 denotes a transistor; 2 and 4, uniformly distributed RC networks; 3 and 5, variable capacitance elements; 6, an input terminal of the circuit, and 7, an output terminal.

Referring to FIG. 1, there is shown a basic circuit of the variable line equalizer of the invention, which comprises a transistor 1, a uniformly distributed RC network 2 and a variable capacitance element 3 which are connected in parallel with each other to serve as the load on the collector side of said transistor, and another uniformly distributed RC network 4 and a variable capacitance element 5 connected in parallel with each other to serve as the load on the emitter side of said transistor. For the simplicity of explanation, the DC circuit is not illustrated. When the constants of the two RC networks 2 and 4 are suitably chosen, it becomes possible to realize a variable line equalizer capable of accurately compensating for the attenuation characteristics of the coaxial line over a wide band, as will more concretely be described below.

Assuming in FIG. 1 that the uniformly distributed RC networks 2 and 4 are characteristically the same, with the total resistance $R_T$ and the total capacitance $C_T$, and that the variable capacitance elements 3 and 5 have capacitance values $C_C$ and $C_E$ respectively, the load admittance $Y_E$ on the emitter side, and the load admittance $Y_C$ on the collector side are expressed as:

$$Y_E = \sqrt{C_T/R_T} \quad \sqrt{S} \coth \quad \sqrt{C_T R_T S} + C_E S \tag{1}$$

$$Y_C = \sqrt{C_T/R_T} \quad \sqrt{S} \coth \quad \sqrt{C_T R_T S} + C_C S \tag{2}$$

where S represents a complex angular frequency, and the first term of each equation indicates one-terminal pair admittance of the uniformly distributed RC network. It is known that when load impedances $Z_E$ and $Z_C$ are connected respectively on the emitter and collector sides of the transistor, then the base-collector voltage transfer function T(s) of the transistor is equal to the ratio $Z_C/Z_E$ on condition that the current amplification factor $\beta$ of the transistor is large enough. Hence, in FIG. 1, the voltage transfer function T(s) between the input terminal 6 and the output terminal 7 will be $$T(s)=\frac{Y_E}{Y_C}=\frac{\sqrt{\frac{C_T}{R_T}}\sqrt{S}\coth\sqrt{C_T R_T S}+C_E S}{\sqrt{\frac{C_T}{R_T}}\sqrt{S}\coth\sqrt{C_R R_T S}+C_C S}$$

$$=\frac{1+\tanh\sqrt{C_T R_T S}\cdot\sqrt{\left(\frac{R_T}{C_T}C_E^2\right)S}}{1+\tanh\sqrt{C_T R_T S}\cdot\sqrt{\left(\frac{R_T}{C_T}C_E^2\right)S}} \tag{3}$$

It is assumed here that $S = jw$, where $j^2 = -1$ and $w$ is the angular frequency. Also $w_c$ is defined as $$w_c = 1/R_T C_T \quad (4)$$

If the condition $w >> w_c$ exists, then $$\tanh \sqrt{C_T R_T jw} \cong 1 \quad (5)$$

Hence Equation (3) may be rewritten as $$T(s) \simeq \frac{1+\sqrt{\left(\frac{R_T}{C_T} C_E^2\right) S}}{1+\sqrt{\left(\frac{R_T}{C_T} C_C^2\right) S}} \quad (6)$$

In other words, the transfer function $T(s)$ becomes equal to the first order rational function of $\sqrt{S}$. Equation (5) holds when $w \geqq 10 w_c$, to an error smaller than $\pm$ 1% of absolute value, or when $w \geqq w_c$, to an error smaller than $\pm$10%.

It is assumed that the amplitude characteristic of Equation (6) be $$A(w) = 20 \log_{10} | T(jw) | = A_1(w) - A_2(w) \ (dB) \quad (7)$$

where $$A_1(w) = 20 \log_{10} | 1 + \sqrt{(R_T/C_T C_E^2) jw} | \ (dB) \quad (8)$$

$$A_2(w) = 20 \log_{10} | 1 + \sqrt{(R_T/C_T C_C^2 jw} | \ (dB) \quad (9)$$

and that the variable range of the capacitance of the variable capacitance elements are, $$0 \leqq C_E \leqq C_M; \ . \leqq C_C \leqq C_M \quad (10)$$

where $C_M$ is the maximum capacitance.

Then, the amplitude characteristic $A_M(w)$ is given as $$A_M(w) = 20 \log_{10} | 1 + \sqrt{(R_T/C_T C_M^2) jw} | \ (dB) \quad (11)$$

where $A_M(w)$ represents $A_1(w)$ when $C_C = C_M$, or $A_2(w)$ when $C_E = C_M$. This amplitude characteristic is shown by the curve 8 in FIG. 2. The curve 9 represents another amplitude characteristic expressed by the following equation.

$$C(w) = 5.5 \sqrt{w/w_o} \ (dB) \quad (12)$$

where $$w_o = C_T/R_T C_M 2 \quad (13)$$

Figure 2:
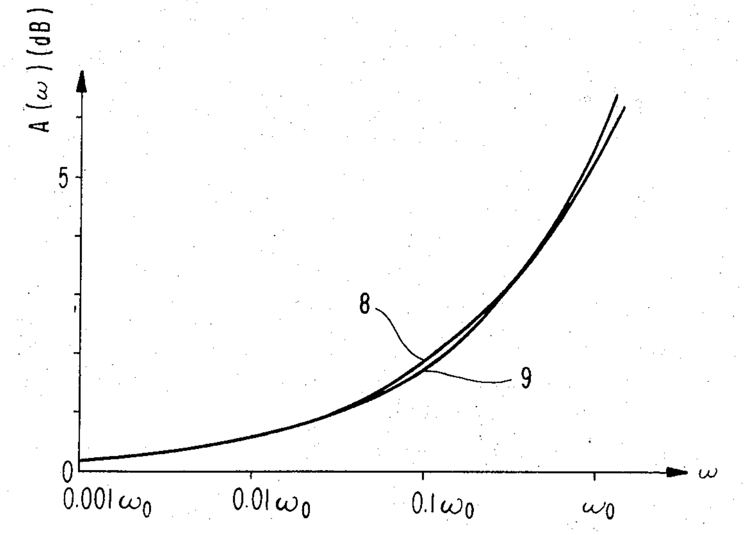
FIG. 2 is a diagram showing the approximation characteristics of the equalizer of the invention in which the numeral 8 denotes the transfer characteristic of the variable line equalizer; and 9, the $\sqrt{w}$ characteristic approximated by the variable line equalizer.

FIG. 2 evidences the fact that Equation (11) agrees with Equation (12) within a deviation of $\pm$0.17 dB, in the angular frequency range of $$0 \leqq w \leqq w_o \quad (14)$$

The characteristic $C(w)$ of Equation (12) is proportional to the square-root of the frequency used. Namely, $C(w)$ represents the attenuation characteristic of the coaxial line. Stated differently, $A_M(w)$ of Equation (11) is accurately approximated to the characteristic of coaxial line loss (5.5 dB at $w_o$) over the range of entire angular frequencies below $w_o$, where the approximation accuracy is within $\pm$0.17 dB. In Equation (11), when $C_M$ changes to $KC_M$ ($K$; a constant in the range of $0 \leqq K \leqq 1$), then the right term of Equation (11) is reduced to $$= 20 \log_{10} | 1 + \sqrt{R_T/C_T (KC_M)^2 jw} |$$
$$= 20 \log_{10} | 1 + \sqrt{(R_T/C_T C_M^2) j (K^2 w)} | \quad (15)$$

Figure 3:
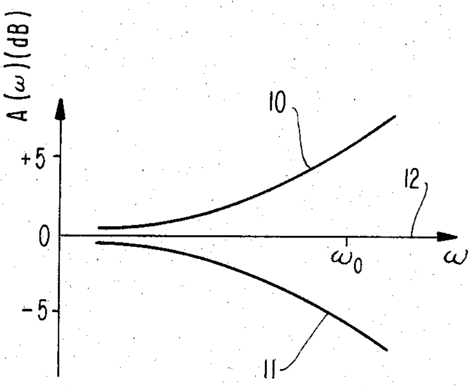
FIG. 3 is a diagram showing the transfer characteristics of the variable line equalizer of the invention in which 10, 11 and 12 denote transfer characteristics obtained against different capacitances of the variable capacitance element.

This indicates that the attenuation characteristic is approximated to $$5.5 \sqrt{(K^2 w)/w_o} \quad (16)$$

in the angular frequency range:

$$0 \leqq w \leqq w_o/K^2 \quad (17)$$

at a deviation within $\pm$ 0.17 dB. Since $w_o/K^2 \geqq w_o$, Equation (17) may be replaced with Equation (14). Equation (16) gives the value of $\sqrt{w}$ characteristic which is smaller by a factor of $K$ ($\leqq 1$) than the proportional constant of the $\sqrt{w}$ characteristic of Equation (12). The fact that the value of $K$ is changed arbitrarily from 0 to 1 means that $C_C$ and $C_E$ are changed arbitrarily from 0 to $C_M$. In other words, $A(w)$ of Equation (7) is approximated to an arbitrary $\sqrt{w}$ characteristic from $+5.5 \sqrt{w/w_o}$ to $-5.5 \sqrt{w/w_o}$ at a deviation within $\pm$0.17 dB in the angular frequency range of Equation (14). FIG. 3 shows typical example of amplitude characteristic $A(w)$ when $C_C$ and $C_E$ are changed. The curve 10 is for the characteristic on condition that $C_C = C_M$ and $C_E = 0$; the curve 11 on condition that $C_C = 0$ and $C_E = C_M$; and the straight line 12 on condition that $C_E = C_C$.

As described above, the variable equalizer of the present invention is simple in circuit construction, yet capable of accurately compensating for variations in the coaxial line loss over a wide frequency band. Because the invention makes it possible to dispense with the need for inductors and simplify the circuit configuration, the equalizer can be integrated into a miniature construction.

Concrete circuit constants required when designing a variable equalizer with the maximum variable range of $\pm$ 5.5 dB at 400 MHz will be shown below.

From Equation (13), $$2\pi \times 400 \times 10^6 = C_T/R_T C_M 2 \quad (18)$$

When the frequency range in which Equation (5) holds for approximation is above 1 MHz, the following equation is led from Equation (4):

$$w_C = 2\pi \times 1 \times 10^6 = 1/R_T C_T \quad (19)$$

If the frequency range is below 1 MHz, Equation (5) does not hold, and $A(w)$ will become slightly different from the value determined by Equation (7). However, the variable width is as small as $+5.5 \times 1/\sqrt{400} = \pm 0.28$ dB, in contrast to ±5.5 dB at 400 MHz. Hence, even if Equation (5) does not hold for approximation in the variable frequency range below 1 MHz, this will not appreciably affect the transfer characteristic which approximates to $\sqrt{w}$ characteristic. If $w_c$ of Equation (6) is determined to be smaller, the influence due to a narrow frequency range can further be reduced. On the other hand, however, the value of $R_T \cdot C_T$ becomes larger, to result in disadvantage with the view to reduce the size of the equalizer. In practice the value determined by Equation (19) is desirable. The desired variable equalizer can be realized when the values of $C_T$, $R_T$ and $R_M$ are determined so as to satisfy Equations (18) and (19). Because there are three variables against two equations, it is possible to choose the desired one of the three variables. Practically, however, the selection of variable is restrained by the condition of the DC supply to the transistor. For example, when the DC resistance values of uniformly distributed RC networks 2 and 4 in FIG. 1 are both $R_T$, and the power source voltage to the transistor is fixed, the value of $R_T$ cannot be arbitrarily increased. When the resistance $R_T$ is adequately determined as $$R_T = 200\ \Omega \qquad (20)$$

then the following equations are derived from Equations (18) and (19).

$$C_T = 800 \text{ pF} \qquad (21)$$

$$C_M = 40 \text{ pF} \qquad (22)$$

Variable capacitance diodes are used for the purpose of variable capacitance elements of the equalizer of the invention. The capacitance of a diode cannot be 0 pF; there normally remains the minimum capacitance of about several picofarads. In the practical variable line equalizer, therefore, the variable range is slightly narrower than ± 5.5 dB; it would be about ±5 dB. When a wider variable range is desired, it is necessary to connect a suitable number of circuits of the invention in the form of cascade. In this case it is not necessary to provide a buffer circuit to insert between individual cascade stages, because the load impedance on the collector side of the transistor 1 in FIG. 1 is as relatively small as 200Ω at DC and becomes smaller as the frequency is increased, as apparent from Equation (2).

While the principles of the invention have been described in detail in connection with one preferred embodiment, together with specific modifications thereof, it is clearly understood that the invention is not limited thereto or thereby.

I claim:

1. A variable line equalizer for providing compensation for a coaxial line over a frequency band from $w_c$ to $w_o$, comprising:

a. a transistor having base, emitter, and collector electrodes, b. a first parallel circuit comprising a first uniformly distributed RC network in parallel with a first variable capacitance, said first parallel circuit being connected to said collector electrode and, c. a second parallel circuit comprising a second uniformly distributed RC network in parallel with a second variable capacitance, said second parallel circuit being connected to said emitter electrode and having a total resistance and capacitance equal to the total resistance and capacitance, respectively, of said first uniformly distributed RC network and, d. the total resistance and capacitance of each said first and second uniformly distributed RC networks is $R_T$ and $C_T$, respectively, each of said first and second variable capacitance varies from approximately zero up to $C_M$, where $R_T$, $C_T$, and $C_M$ satisfy the equations, $$w_c = 1/R_T C_T, \text{ and}$$

$$w_o = C_T/R_T C_M 2$$

and the transfer function $T(s)$ of the equalizer satisfies the approximate equation, $$T(s) \cong 1+\alpha_1 \sqrt{S}/1+\alpha_2 \sqrt{S},$$

where $\alpha_1$ and $\alpha_2$ are constants and S is the complex angular frequency.

2. A variable line equalizer as claimed in claim 1 wherein the capacitances of said first and second variable capacitances are $C_C$ and $C_E$, respectively, and the constants $\alpha_1$ and $\alpha_2$ are defined by the equations, $$\alpha_1 = \sqrt{(R_T/C_T)\ C_E 2},$$

and $$\alpha_2 = \sqrt{(R_T/C_T)\ C_C 2}.$$

3. A variable line equalizer as claimed in claim 1 wherein each of said variable capacitors is a variable capacitance diode.

* * * * *